United States Patent
Atarius et al.

(10) Patent No.: US 11,876,868 B2
(45) Date of Patent: Jan. 16, 2024

(54) DERIVING AN OPERATING SYSTEM IDENTITY

(71) Applicants: Lenovo (Singapore) PTE. LTD., New Tech Park (SG); Roozbeh Atarius, La Jolla, CA (US); Apostolis Salkintzis, Athens (GR); Dimitrios Karampatsis, Ruislip (GB)

(72) Inventors: Roozbeh Atarius, La Jolla, CA (US); Apostolis Salkintzis, Athens (GR); Dimitrios Karampatsis, Ruislip (GB)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 198 days.

(21) Appl. No.: 17/431,404

(22) PCT Filed: Feb. 15, 2019

(86) PCT No.: PCT/EP2019/053889
§ 371 (c)(1),
(2) Date: Aug. 16, 2021

(87) PCT Pub. No.: WO2020/164745
PCT Pub. Date: Aug. 20, 2020

(65) Prior Publication Data
US 2022/0141305 A1    May 5, 2022

(51) Int. Cl.
*H04L 67/303* (2022.01)
*H04L 9/32* (2006.01)
*H04L 9/40* (2022.01)

(52) U.S. Cl.
CPC .......... *H04L 67/303* (2013.01); *H04L 9/3239* (2013.01); *H04L 63/0227* (2013.01)

(58) Field of Classification Search
None
See application file for complete search history.

(56) References Cited

U.S. PATENT DOCUMENTS

| | | | |
|---|---|---|---|
| 7,082,615 B1 * | 7/2006 | Ellison | G06F 21/74 711/163 |
| 9,894,099 B1 | 2/2018 | Jacobsen et al. | |
| 2011/0276621 A1 * | 11/2011 | Edery | G06F 9/45545 718/1 |
| 2015/0271708 A1 | 9/2015 | Zaus et al. | |

(Continued)

OTHER PUBLICATIONS

Leach, P. et al., "A Universally Unique IDentifier (UUID) URN Namespace", RFC 4122, Jun. 2005, pp. 1-32.

(Continued)

*Primary Examiner* — Tonia L Dollinger
*Assistant Examiner* — Jonathan A Sparks
(74) *Attorney, Agent, or Firm* — Kunzler Bean & Adamson (57) ABSTRACT

Apparatuses, methods, and systems are disclosed for deriving an operating system identity. One method includes determining, at a remote unit, a type of operating system used by the remote unit. The method includes determining a domain name corresponding to the type of operating system. The method includes deriving an operating system identity by applying a hash function to the domain name and a predetermined value. The method includes transmitting a first message to a mobile communication network. In such embodiments, the first message includes the operating system identity.

18 Claims, 6 Drawing Sheets

(56) References Cited

U.S. PATENT DOCUMENTS

2019/0123905 A1\* 4/2019 Kirner ................... H04L 9/3268
2020/0169555 A1\* 5/2020 Chung ................ H04L 63/0876

OTHER PUBLICATIONS

Eastlake, D. et al., "Randomness Requirements for Security", BCP 106, RFC 4086, Jun. 2005, pp. 1-48.
National Institute of Standards and Technology, "Secure Hash Standard", FIPS PUB 180-1, Apr. 1995, <http://www.itl.nist.gov/fipspubs/fip180-1.htm> , pp. 1-28.
International Searching Authority, "Notification of Transmittal of the International Search Report and the Written Opinion of the International Searching Authority, or the Declaration", PCT, dated Jul. 3, 2019, pp. 1-16.
ETSI, Hybrid Broadcast Broadband TV, ETSI TS 102 796 V1.5.1, Sep. 2018, pp. 1-316.

\* cited by examiner

DERIVING AN OPERATING SYSTEM IDENTITY

FIELD

The subject matter disclosed herein relates generally to wireless communications and more particularly relates to deriving an operating system identity.

BACKGROUND

The following abbreviations are herewith defined, at least some of which are referred to within the following description: Third Generation Partnership Project ("3GPP"), Five Generation System ("5GS"), Positive-Acknowledgment ("ACK"), Access and Mobility Management Function ("AMF"), Access Network ("AN"), Application Function ("AF"), Application Programming Interface ("API"), Access Point Name ("APN"), Aggregate MBR ("AMBR"), Application Server ("AS"), Connection Management ("CM"), Core Network ("CN"), Communication Pattern ("CP"), Control Plane/User Plane ("CP/UP"), Circuit Switched ("CS"), Discontinuous Reception ("DRX"), Downlink ("DL"), Data Network Access Identifier ("DNAI"), Data Network ("DN"), Data Network Name ("DNN"), Domain Name System ("DNS"), Exchanged Data Rates for GSM Evolution ("EDGE"), Enhanced Discontinuous Reception ("eDRX"), Enhanced Mobile Broadband ("eMBB"), Evolved Node B ("eNB"), Evolved Packet System ("EPS"), Evolved UTRA ("E-UTRA"), Evolved UTRAN ("E-UTRAN"), GSM EDGE Radio Access Network ("GERAN"), General Packet Radio Service ("GPRS"), Generic Public Subscription Identifier ("GPSI"), Global System for Mobiles ("GSM"), Home Public Land Mobile Network ("HPLMN"), Home Subscriber Server ("HSS"), Identity or Identifier or Identification ("ID"), IP Multimedia Subsystem ("IMS"), International Mobile Subscriber Identity ("IMSI"), Internet-of-Things ("IoT"), Internet Protocol ("IP"), Long Term Evolution ("LTE"), Multiple Access ("MA"), Maximum Bit Rate ("MBR"), Modulation Coding Scheme ("MCS"), Mobile Country Code ("MCC"), Mobility Management ("MM"), Mobility Management Entity ("MME"), Mobile Network Code ("MNC"), Mobile Network Operator ("MNO"), Machine Type Communication ("MTC"), Master Information Block ("MIB"), Mobile Initiated Connection Only ("MICO"), Mobility Management ("MM"), Mobile Switching Center ("MSC"), Mobile Station International Subscriber Directory Number ("MSSDN"), Non-3GPP Interworking Functions ("N3IWF"), Non-Access Stratum ("NAS"), Narrowband ("NB"), North Bound Interface ("NBI"), Network Parameter Configuration ("NC"), Negative-Acknowledgment ("NACK") or ("NAK"), Network Exposure Function ("NEF"), Next Generation ("NG"), Next Generation Node B ("gNB"), Operating System ("OS"), Policy Control Function ("PCF"), Protocol Data Unit ("PDU"), PDN Gateway ("PGW"), Public Land Mobile Network ("PLMN"), Packet Switched ("PS"), Power Saving Mode ("PSM"), Pointer ("PTR"), Quality of Service ("QoS"), QoS Flow Identifiers ("QFIs"), Radio Resource Control ("RRC"), Radio Access Network ("RAN"), Radio Access Technology ("RAT"), Receive ("RX"), Single Carrier Frequency Division Multiple Access ("SC-FDMA"), Service Capability Exposure Function ("SCEF"), Service Capability Servers ("SCS"), Serving GPRS Support Node ("SGSN"), Service Level Agreement ("SLA"), Subscriber Management ("SM"), Subscriber Management Function ("SMF"), Single Network Slice Selection Assistance Information ("S-NSSAI"), Subscriber Identity Module ("SIM"), System Information Block ("SIB"), Short Message Service ("SMS"), Signaling Radio Bearers ("SRBs"), Single Radio Voice Call Continuity ("SRVCC"), Session and Service Continuity ("SSC"), Subscription Concealed Identifier ("SUCI"), Subscription Permanent Identifier ("SUPI"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Universal Terrestrial Radio Access ("UTRA"), Universal Terrestrial Radio Access Network ("UTRAN"), Universal Unique Identifier ("UUID"), Visited Public Land Mobile Network ("VPLMN"), WiFi Local Area Network ("WLAN").

In certain wireless communications networks, a UE may receive information for applications that are not applicable to the UE.

BRIEF SUMMARY

Methods for deriving an operating system identity are disclosed. Apparatuses and systems also perform the functions of the apparatus. In one embodiment, the method includes determining, at a remote unit, a type of operating system used by the remote unit. In various embodiments, the method includes determining a domain name corresponding to the type of operating system. In certain embodiments, the method includes deriving an operating system identity by applying a hash function to the domain name and a predetermined value. In some embodiments, the method includes transmitting a first message to a mobile communication network. In such embodiments, the first message includes the operating system identity.

An apparatus for deriving an operating system identity, in one embodiment, includes a processor that: determines a type of operating system used by the apparatus; determines a domain name corresponding to the type of operating system; and derives an operating system identity by applying a hash function to the domain name and a predetermined value. In various embodiments, the apparatus includes a transmitter that transmits a first message to a mobile communication network. In such embodiments, the first message includes the operating system identity.

One method for decoding an operating system identity includes receiving, at a network unit, a first message including an operating system identity. In such a method, the operating system identity is derived by applying a hash function to a domain name and a predetermined value. In some embodiments, the method includes determining a type of operating system used by a remote unit from the operating system identity. In such embodiments, the domain name corresponds to the type of operating system.

An apparatus for decoding an operating system identity, in one embodiment, includes a receiver that receives a first message including an operating system identity. In such an embodiment, the operating system identity is derived by applying a hash function to a domain name and a predetermined value. In various embodiments, the apparatus includes a processor that determines a type of operating system used by a remote unit from the operating system identity. In such embodiments, the domain name corresponds to the type of operating system.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
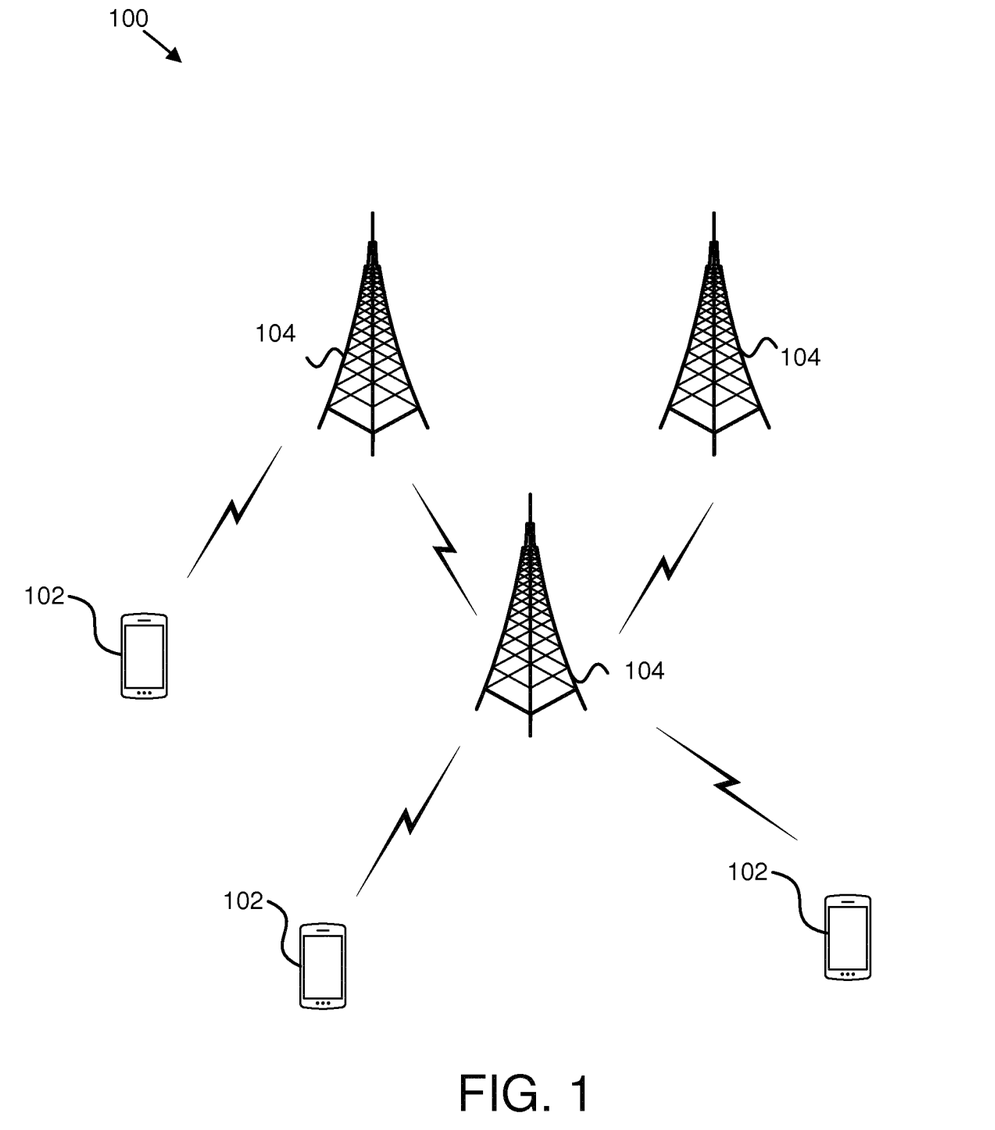
FIG. 1 is a schematic block diagram illustrating one embodiment of a wireless communication system for deriving an operating system identity.

FIG. 1 depicts an embodiment of a wireless communication system 100 for deriving an operating system identity. In one embodiment, the wireless communication system 100 includes remote units 102, and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a network device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components a gNB, a NG-RAN node, a RAN node, a core network, an MME, an HSS, an SCEF, an AMF, an SMF, an NEF, a DB, a PCF, a UDR, a UPF, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may determine a type of operating system used by the remote unit 102. In various embodiments, the remote unit 102 may determine a domain name corresponding to the type of operating system. In certain embodiments, the remote unit 102 may derive an operating system identity by applying a hash function to the domain name and a predetermined value. In some embodiments, the remote unit 102 may transmit a first message to a mobile communication network. In such embodiments, the first message includes the operating system identity. Accordingly, a remote unit 102 may be used for deriving an operating system identity.

In various embodiments, a network unit 104 may receive a first message comprising an operating system identity. The operating system identity may be derived by applying a hash function to a domain name and a predetermined value. In some embodiments, the network unit 104 may determine a type of operating system used by a remote unit 102 from the operating system identity. In such embodiments, the domain name corresponds to the type of operating system. Accordingly, a network unit 104 may be used for decoding an operating system identity.

Figure 2:
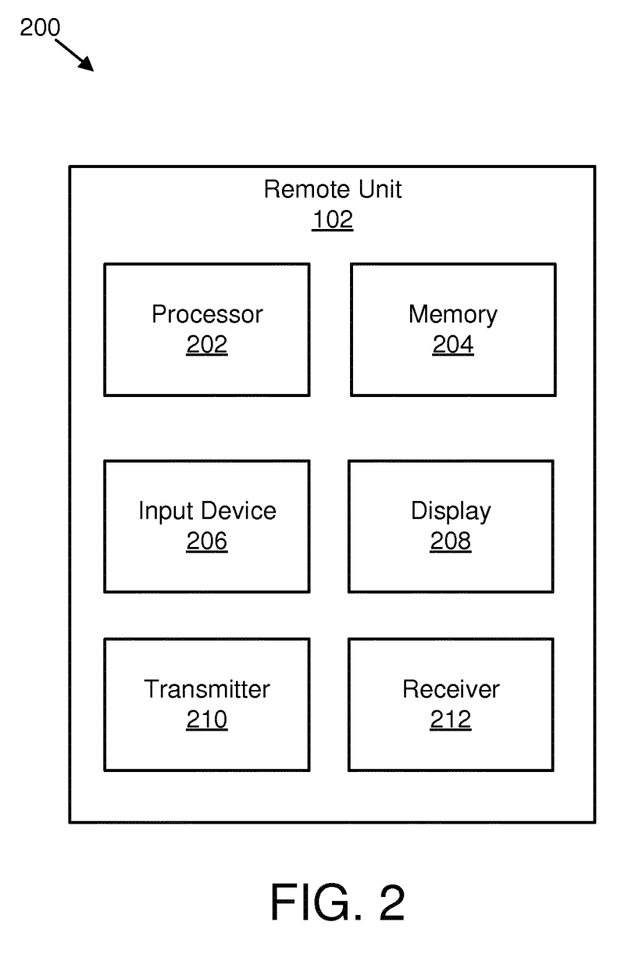
FIG. 2 is a schematic block diagram illustrating one embodiment of an apparatus that may be used for deriving an operating system identity.

FIG. 2 depicts one embodiment of an apparatus 200 that may be used for deriving an operating system identity. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: determines a type of operating system used by the remote unit 102; determines a domain name corresponding to the type of operating system; and derives an operating system identity by applying a hash function to the domain name and a predetermined value. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to network registration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the transmitter 210 may transmit a first message to a mobile communication network. In such embodiments, the first message may include an operating system identity. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
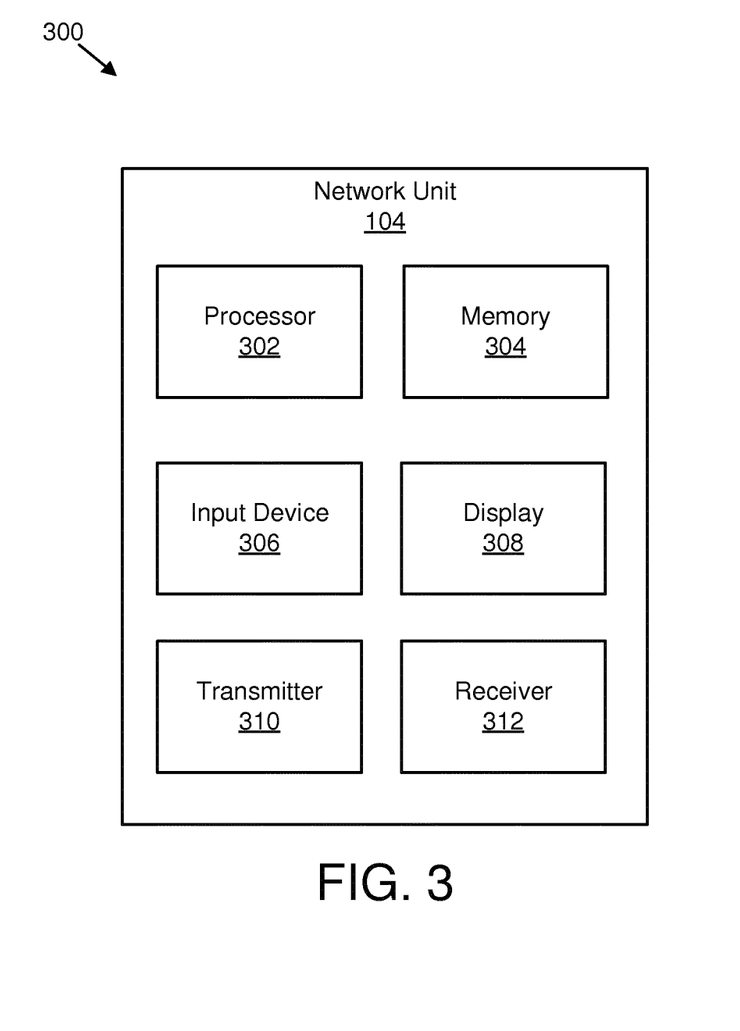
FIG. 3 is a schematic block diagram illustrating one embodiment of an apparatus that may be used for decoding an operating system identity.

FIG. 3 depicts one embodiment of an apparatus 300 that may be used for decoding an operating system identity. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 receives a first message including an operating system identity. In such an embodiment, the operating system identity is derived by applying a hash function to a domain name and a predetermined value. In various embodiments, the processor 302 determines a type of operating system used by a remote unit 102 from the operating system identity. In such embodiments, the domain name corresponds to the type of operating system.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

As described herein, a remote unit 102 may create an identity for an OS (e.g., OS ID) operable in (e.g., used by) the remote unit 102. After creating the OS ID, the remote unit 102 may transmit the OS ID to a PCF in a mobile communication network, and may receive policy rules to be used by the OS in the remote unit 102.

In certain embodiments, a PCF transmits policy rules to a remote unit 102. In such embodiments, the policy rules may contain information about applications for different OSs. By having the remote unit 102 provide an identity of its OS to the PCF, transmission of the application identifiers from the PCF for all the OSs may be avoided. For example, after the PCF is aware of the remote unit's 102 OS, it may only transmit application identifiers for the remote unit's 102 OS.

In one embodiment, a remote unit 102 may provide an ID of its OS to a PCF. In such an embodiment, the remote unit's 102 OS ID may have a format of a UUID. Moreover, the OS ID may be created as according to the following equation:
OS ID (e.g., UUID)=HASH (Namespace_DNS+ OS_specific_domain_name), where: HASH refers to a hash function (e.g., a Secure Hash Algorithm 1 ("SHA-1"); the NameSpace_DNS is a predefined (e.g., predetermined) UUID and may be equal to 6ba7b810-9dad-11d1-80b4-00c04fd430c8; and the OS_specific_domain_name includes either (a) a domain name having a string that indicates a type of OS supported by the remote unit 102 (e.g., "android," "iOS," and so forth) followed by an extension field (e.g., "0.3gpp," ".com," and so forth), or (b) a domain name that indicates an application store from which applications in the remote unit 102 may be downloaded (e.g., "play.google-.com," and so forth).

In certain embodiments, a remote unit 102 may use a hash algorithm such as SHA-1 if backward compatibility is not required because a created UUID is truncated to 16 octets or 128 bits from its original length (e.g., the original length is 20 octets or 160 bits).

In various embodiments, a remote unit 102 may use MD5 as a hash algorithm if backward compatibility is an issue and a created UUID is not to be truncated (e.g., the output of MD5 is 16 octets or 128 bits).

In some embodiments, a remote unit 102 may use SHA-1 for creating a UUID for an OS ID by computing a hash of a name space DNS (e.g., NameSpace_DNS) concatenated with a domain name of a location for applications obtained by the remote unit 102. For example, a remote unit 102 may use a name space DNS (e.g., NameSpace_DNS) as a names space ID. Moreover, the remote unit 102 may use a type of OS of the remote unit 102 to derive a domain name. Furthermore, the remote unit 102 may use SHA-1 for creating a UUID for an OS ID by computing a hash of the name space DNS (e.g., NamesSpace_DNS) concatenated with the domain name derived by the type of the OS the remote unit 102.

In certain embodiments, a remote unit 102 may use MD5 for creating a UUID for an OS ID by computing a hash of a name space DNS (e.g., NamesSpace_DNS) concatenated with a domain name of a location for applications obtained by the remote unit 102. For example, a remote unit 102 may use a name space DNS (e.g., NameSpace_DNS) as a name space ID. Moreover, the remote unit 102 may use a type of OS of the remote unit 102 to derive a domain name. Furthermore, the remote unit 102 may use MD5 for creating a UUID for an OS ID by computing a hash of the name space DNS (e.g., NamesSpace_DNS) concatenated with the domain name derived by the type of the OS the remote unit 102.

As may be appreciated, any type of hash function may be used, such as SHA-1, MD5, SHA-2, SHA-3 or any other hash function.

In one embodiment, a domain name may be derived using a type of OS used in a remote unit 102 (e.g., "android.com," "ios.com," "ubuntu.com," "macos.com," and so forth). In another embodiment, other domain names may be derived using a type of OS used in a remote unit 102 (e.g., "android.osid.com," "ios.osid.com," "ubuntu.osid.com," "macos.osid.com," and so forth). In other embodiments, additional domain names may be derived using a type of OS used in a remote unit 102 (e.g., "android.3gpp," "ios.3gpp," "ubuntu.3gpp," "macos.3gpp," and so forth). In yet other embodiments, further domain names may be derived using a type of OS used in a remote unit 102 (e.g., "android.osid.3gpp," "ios.osid.3gpp," "ubuntu.osid.3gpp," "macos.osid.3gpp," and so forth). As may be appreciated, the domain names described herein are examples of possible domain names, but any suitable domain name may be used.

In certain embodiments, a domain name may be derived in a remote unit 102 by identifying an application store from which the remote unit 102 may download applications, and determining the domain name associated with the application store. In one embodiment, the remote unit 102 identifies that applications may be downloaded from the Google® play store, which uses the domain name "play.google.com".

Figure 4:
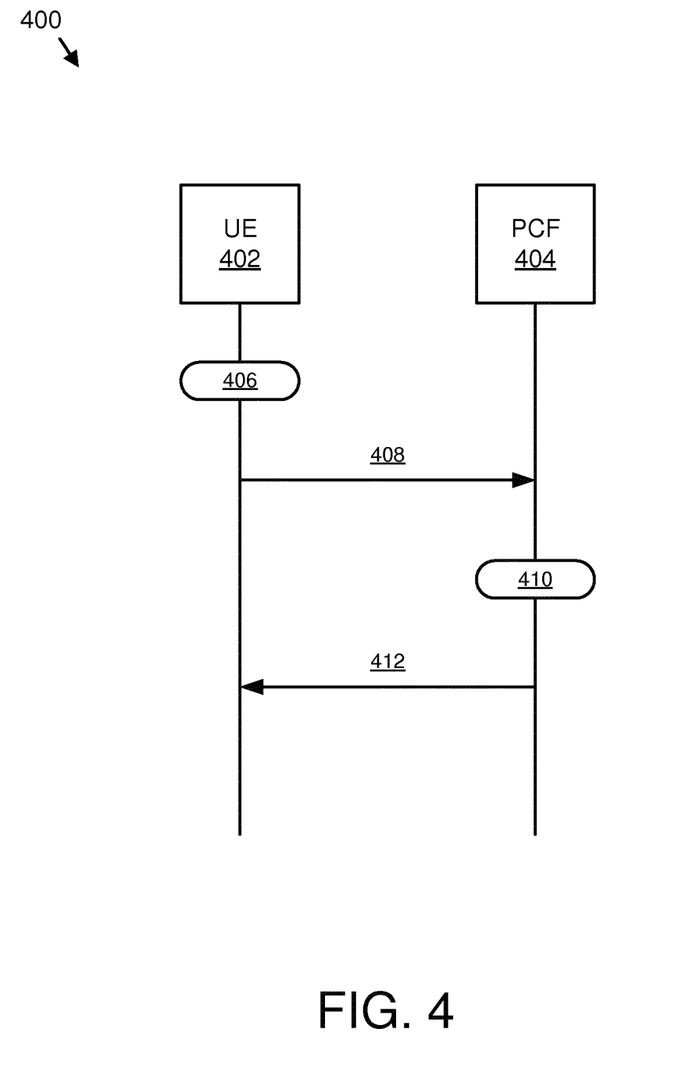
FIG. 4 illustrates one embodiment of communications between two devices.

FIG. 4 illustrates one embodiment of communications 400 between two devices. Specifically, communications 400 between a UE 402 and a PCF 404 are illustrated. As may be appreciated, any of the communications 400 described herein may be considered messages and/or parts of messages.

The UE 402 creates 406 an OS ID using a hash function to compute a hash of a name space identity (e.g., NamesSpace_DNS) concatenated with a domain name. The hash function may be SHA-1, MD5, or another has function. The name space identity (e.g., NameSpace_DNS) may be a name space DNS. The domain name may be derived from a location for applications corresponding to the OS type for the UE 402 or derived directly from the OS type that the UE 402 uses.

In a first communication 408 from the UE 402 to the PCF 404, the UE 402 transmits the OS ID in a message request to the PCF 404. The first communication 408 may be transmitted at a time of UE 402 initial registration with a mobile communications network, at any time used for the UE 402 to deliver to the PCF 404 information about the UE 402 policy identified by a selected PLMN, or at a time the UE 402 changes a radio access technology and/or a core access technology (e.g., at a time in which the UE 402 changes from an EPS to a 5GS).

The PCF 404 determines 410 the UE's 402 policy rules for applications based on the OS ID that it has received from the UE 402. In some embodiments, the PCF 404 may determine the type of OS used by the UE 402 based on the OS ID. In certain embodiments, the PCF 404 may use a reverse hash function to reverse the has performed by the UE 402 to determine the type of OS of the UE 402. In various embodiments, the PCF 404 may use a lookup table to lookup the type of OS used by the UE 402. The lookup table may include a mapping between types of OS and OS IDs. In some embodiments, the PCF 404 may use a comparison hash function to determine the type of OS of the UE 402. For example, the PCF 404 may perform a hash of a name space identity (e.g., NamesSpace_DNS) concatenated with a domain name and may compare the result to the OS ID. In a second communication 412, the PCF 404 may transmit the policy rules for the applications based on the UE's 402 OS to the UE 402.

Figure 5:
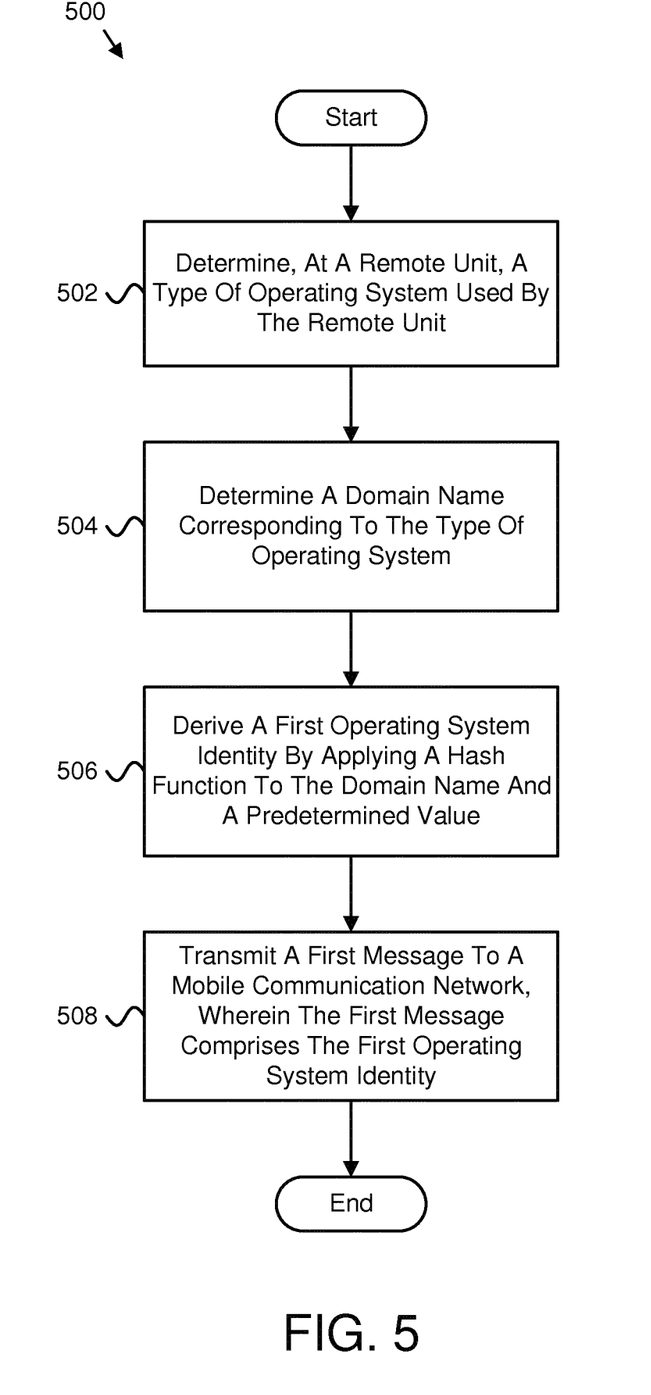
FIG. 5 is a schematic flow chart diagram illustrating one embodiment of a method for deriving an operating system identity.

FIG. 5 is a schematic flow chart diagram illustrating one embodiment of a method 500 for deriving an operating system identity. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502, at a remote unit 102, a type of operating system used by the remote unit 102. In various embodiments, the method 500 includes determining 504 a domain name corresponding to the type of operating system. In certain embodiments, the method 500 includes deriving 506 an operating system identity by applying a hash function to the domain name and a predetermined value. In some embodiments, the method 500 includes transmitting 508 a first message to a mobile communication network. In such embodiments, the first message includes the operating system identity.

In certain embodiments, the method 500 further comprises receiving a second message from the mobile communication network, wherein the second message comprises rules associated with the operating system identity. In some embodiments, the mobile communication network determines the type of operating system used by the remote unit from the first message to transmit the second message. In various embodiments, the rules are associated with the type of operating system.

In one embodiment, the domain name is a domain that the remote unit uses to download applications. In certain embodiments, the hash function is SHA-1. In some embodiments, the hash function is MD5.

In various embodiments, the predetermined value is Namespace_DNS. In one embodiment, the domain name is derived from the type of operating system. In certain embodiments, the domain name is derived from a location of applications. In some embodiments, the domain name comprises a 3gpp extension.

Figure 6:
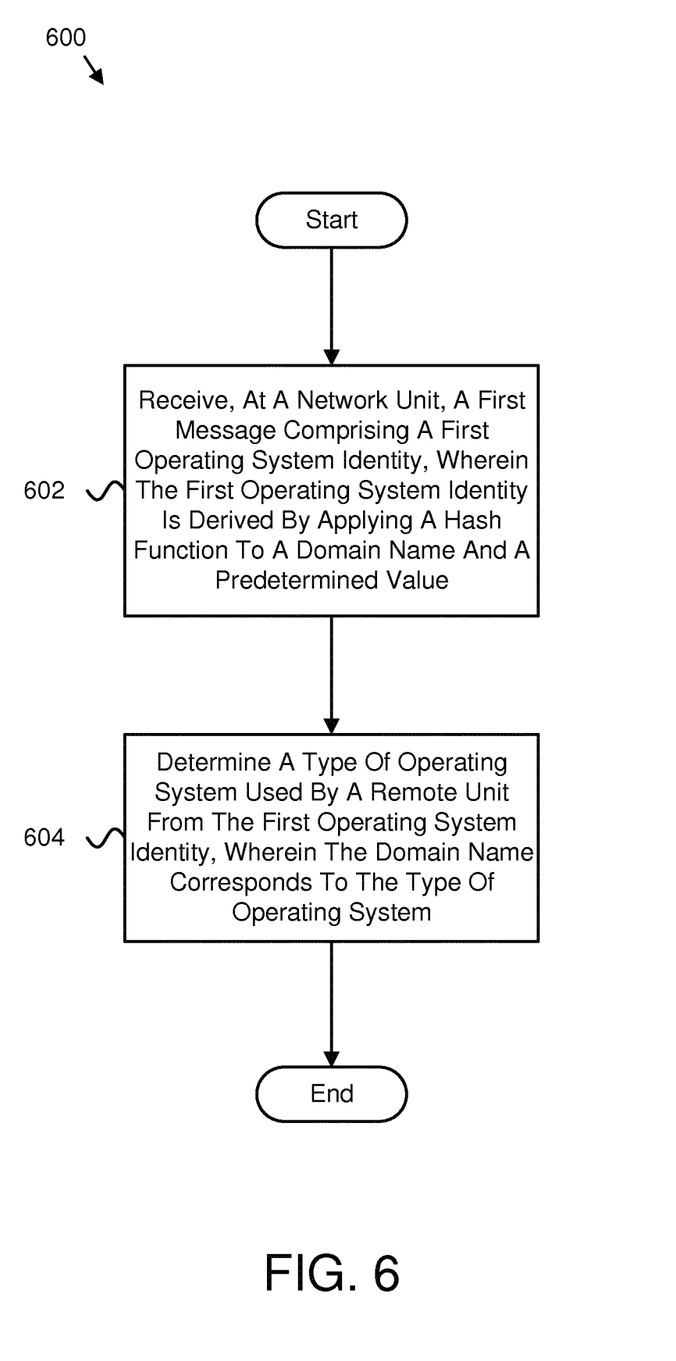
FIG. 6 is a schematic flow chart diagram illustrating one embodiment of a method for decoding an operating system identity.

FIG. 6 is a schematic flow chart diagram illustrating one embodiment of a method 600 for decoding an operating system identity. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602, at a network unit 104, a first message including an operating system identity. In such a method, the operating system identity is derived by applying a hash function to a domain name and a predetermined value. In some embodiments, the method 600 includes determining 604 a type of operating system used by a remote unit 102 from the operating system identity. In such embodiments, the domain name corresponds to the type of operating system.

In certain embodiments, the method 600 further comprises transmitting a second message from the network unit, wherein the second message comprises rules associated with the operating system identity. In some embodiments, the rules are associated with the type of operating system. In various embodiments, the domain name is a domain that the remote unit uses to download applications.

In one embodiment, the hash function is SHA-1. In certain embodiments, the hash function is MD5. In some embodiments, the predetermined value is Namespace_DNS.

In various embodiments, the domain name is derived from the type of operating system. In one embodiment, the domain name is derived from a location of applications. In certain embodiments, the domain name comprises a 3gpp extension. In some embodiments, determining the type of operating system used by the remote unit from the operating system identity comprises using a reverse hash function, a lookup table, a comparison hash function, or some combination thereof.

In one embodiment, a method comprises: determining, at a remote unit, a type of operating system used by the remote unit; determining a domain name corresponding to the type of operating system; deriving an operating system identity by applying a hash function to the domain name and a predetermined value; and transmitting a first message to a mobile communication network, wherein the first message comprises the operating system identity.

In certain embodiments, the method further comprises receiving a second message from the mobile communication network, wherein the second message comprises rules associated with the operating system identity.

In some embodiments, the mobile communication network determines the type of operating system used by the remote unit from the first message to transmit the second message.

In various embodiments, the rules are associated with the type of operating system.

In one embodiment, the domain name is a domain that the remote unit uses to download applications.

In certain embodiments, the hash function is SHA-1.

In some embodiments, the hash function is MD5.

In various embodiments, the predetermined value is Namespace_DNS.

In one embodiment, the domain name is derived from the type of operating system.

In certain embodiments, the domain name is derived from a location of applications.

In some embodiments, the domain name comprises a 3gpp extension.

In one embodiment, an apparatus comprises: a processor that: determines a type of operating system used by the apparatus; determines a domain name corresponding to the type of operating system; and derives an operating system identity by applying a hash function to the domain name and a predetermined value; and a transmitter that transmits a first message to a mobile communication network, wherein the first message comprises the operating system identity.

In certain embodiments, the apparatus further comprises a receiver that receives a second message from the mobile communication network, wherein the second message comprises rules associated with the operating system identity.

In some embodiments, the mobile communication network determines the type of operating system used by the apparatus from the first message to transmit the second message.

In various embodiments, the rules are associated with the type of operating system.

In one embodiment, the domain name is a domain that the apparatus uses to download applications.

In certain embodiments, the hash function is SHA-1.

In some embodiments, the hash function is MD5.

In various embodiments, the predetermined value is Namespace_DNS.

In one embodiment, the domain name is derived from the type of operating system.

In certain embodiments, the domain name is derived from a location of applications.

In some embodiments, the domain name comprises a 3gpp extension.

In one embodiment, a method comprises: receiving, at a network unit, a first message comprising an operating system identity, wherein the operating system identity is derived by applying a hash function to a domain name and a predetermined value; and determining a type of operating system used by a remote unit from the operating system identity, wherein the domain name corresponds to the type of operating system.

In certain embodiments, the method further comprises transmitting a second message from the network unit, wherein the second message comprises rules associated with the operating system identity.

In some embodiments, the rules are associated with the type of operating system.

In various embodiments, the domain name is a domain that the remote unit uses to download applications.

In one embodiment, the hash function is SHA-1.

In certain embodiments, the hash function is MD5.

In some embodiments, the predetermined value is Namespace_DNS.

In various embodiments, the domain name is derived from the type of operating system.

In one embodiment, the domain name is derived from a location of applications.

In certain embodiments, the domain name comprises a 3gpp extension.

In some embodiments, determining the type of operating system used by the remote unit from the operating system identity comprises using a reverse hash function, a lookup table, a comparison hash function, or some combination thereof.

In one embodiment, an apparatus comprises: a receiver that receives a first message comprising an operating system identity, wherein the operating system identity is derived by applying a hash function to a domain name and a predetermined value; and a processor that determines a type of operating system used by a remote unit from the operating system identity, wherein the domain name corresponds to the type of operating system.

In certain embodiments, the apparatus further comprises a transmitter that transmits a second message, wherein the second message comprises rules associated with the operating system identity.

In some embodiments, the rules are associated with the type of operating system.

In various embodiments, the domain name is a domain that the remote unit uses to download applications.

In one embodiment, the hash function is SHA-1.

In certain embodiments, the hash function is MD5.

In some embodiments, the predetermined value is Namespace_DNS.

In various embodiments, the domain name is derived from the type of operating system.

In one embodiment, the domain name is derived from a location of applications.

In certain embodiments, the domain name comprises a 3gpp extension.

In some embodiments, the processor determines the type of operating system used by the remote unit from the operating system identity by using a reverse hash function, a lookup table, a comparison hash function, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   determining a type of operating system used by the UE;
   determining a domain name corresponding to the type of operating system;
   deriving an operating system identity by applying a hash function to a sum of the domain name and a value comprising a namespace domain name system (DNS); and
   transmitting a first message comprising the operating system identity.

2. The method of claim 1, further comprising receiving a second message comprising rules associated with the operating system identity.

3. The method of claim 2, wherein the rules are associated with the type of operating system.

4. The method of claim 1, wherein the domain name i-s-corresponds to a domain that the UE uses to download one or more applications.

5. The method of claim 1, wherein the hash function is a secure hash algorithm-1 (SHA-1).

6. The method of claim 1, wherein the hash function is a message direct algorithm (MD5).

7. The method of claim 1, wherein the domain name is derived from based on the type of operating system.

8. The method of claim 1, wherein the domain name is derived from based on a location of an application.

9. The method of claim 1, wherein the domain name comprises a 3GPP extension.

10. A user equipment (UE), comprising:
    at least one memory; and
    at least one processor coupled with the at least one memory and configured to cause the UE to:
      determine a type of operating system used by the UE;
      determine a domain name corresponding to the type of operating system;
      derive an operating system identity by applying a hash function to a sum of the domain name and a value comprising a namespace domain name system (DNS); and transmit a first message comprising the operating system identity.

11. An apparatus for performing a network function, the apparatus comprising:
 at least one memory; and
 at least one processor coupled with the at least one memory and configured to cause the apparatus to:
  receive a first message comprising an operating system identity, wherein the operating system identity is based on a hash function applied to a sum of a domain name and a value comprising a namespace domain name system (DNS); and
  determine a type of operating system used by a user equipment (UE) based on the operating system identity, wherein the domain name corresponds to the type of operating system.

12. The apparatus of claim 11, wherein the at least one processor is configured to cause the apparatus to transmit a second message comprising rules associated with the operating system identity.

13. The apparatus of claim 12, wherein the rules are associated with the type of operating system.

14. The apparatus of claim 11, wherein the domain name is corresponds to a domain that the UE uses to download one or more applications.

15. The apparatus of claim 11, wherein the hash function is a secure hash algorithm-1 (SHA-1).

16. The apparatus of claim 11, wherein the hash function is a message direct algorithm (MD5).

17. The apparatus of claim 11, wherein the domain name is based on the type of operating system.

18. A processor for wireless communication, comprising:
 at least one controller coupled with at least one memory and configured to cause the processor to:
  determine a type of operating system used by the processor;
  determine a domain name corresponding to the type of operating system;
  derive an operating system identity by applying a hash function to a sum of the domain name and a value comprising a namespace domain name system (DNS); and
  transmit a first message comprising the operating system identity.

* * * * *